(12) United States Patent
Wilson et al.

(10) Patent No.: US 8,897,699 B2
(45) Date of Patent: Nov. 25, 2014

(54) REDUCING EMISSIONS IN A NEAR FIELD COMMUNICATIONS (NFC) CAPABLE DEVICE

(75) Inventors: Robin Wyndham John Wilson, Cirencester (GB); Philip Dorning, Wiltshire (GB)

(73) Assignee: Broadcom Corporation, Irvine, CA (US)

(*) Notice: Subject to any disclaimer, the term of this patent is extended or adjusted under 35 U.S.C. 154(b) by 608 days.

(21) Appl. No.: 13/112,186

(22) Filed: May 20, 2011

(65) Prior Publication Data

US 2011/0287714 A1    Nov. 24, 2011

(30) Foreign Application Priority Data

| May 20, 2010 | (GB) | .................................. | 1008443.2 |
| May 20, 2010 | (GB) | .................................. | 1008444.0 |
| May 20, 2010 | (GB) | .................................. | 1008445.7 |
| May 28, 2010 | (GB) | .................................. | 1008995.1 |
| May 28, 2010 | (GB) | .................................. | 1008998.5 |
| May 28, 2010 | (GB) | .................................. | 1009000.9 |
| May 28, 2010 | (GB) | .................................. | 1009003.3 |
| May 28, 2010 | (GB) | .................................. | 1009004.1 |

(51) Int. Cl.
*H04B 5/00* (2006.01)

(52) U.S. Cl.
CPC .................................. *H04B 5/0075* (2013.01)
USPC ........................................ 455/41.1; 455/41.2

(58) Field of Classification Search
USPC .................. 455/41.1, 41.2, 77, 574; 326/123; 307/43; 370/352, 329; 340/572.7; 363/89
See application file for complete search history.

(56) References Cited

U.S. PATENT DOCUMENTS

| 6,134,130 | A  * | 10/2000 | Connell et al. ................. | 363/89 |
| 6,229,443 | B1   | 5/2001  | Roesner |  |
| 8,608,635 | B2 * | 12/2013 | Yomtov et al. ................. | 600/17 |
| 2002/0039034 | A1 * | 4/2002 | Kohda ........................... | 326/123 |
| 2004/0155754 | A1   | 8/2004 | Fischer et al. |  |
| 2005/0006956 | A1 * | 1/2005 | Shi .................................. | 307/43 |
| 2006/0198364 | A1 * | 9/2006 | Fujii .............................. | 370/352 |
| 2007/0018832 | A1 * | 1/2007 | Beigel et al. ................ | 340/572.7 |
| 2009/0011706 | A1 * | 1/2009 | Wilson et al. ................. | 455/41.1 |
| 2010/0098012 | A1 * | 4/2010 | Bala et al. ..................... | 370/329 |
| 2011/0181399 | A1 * | 7/2011 | Pollack et al. ............. | 340/10.33 |

FOREIGN PATENT DOCUMENTS

GB         2 321 726  A       8/1998

OTHER PUBLICATIONS

European Search Report for EP Patent Application No. EP11004198.5, European Patent Office, Munich, Germany, mailed on Nov. 15, 2013.
Communication from the Examining Division of the European Patent Office directed to related European Patent Application No. 11 004 198.5, Rijswijk, Netherlands, mailed Jan. 27, 2014; 6 pages.

* cited by examiner

*Primary Examiner* — April G Gonzales
(74) *Attorney, Agent, or Firm* — Sterne, Kessler, Goldstein & Fox P.L.L.C.

(57) ABSTRACT

A near field communications (NFC) device is disclosed that interacts with other NFC devices to exchange information and/or the data. Another NFC device inductively couples a received communications signal onto an antenna circuit of the NFC device to provide a recovered communications signal. An overvoltage protection module regulates a power level of the recovered communication signal by detuning the antenna circuit when the power level of the recovered communication signal may cause damage the NFC device. Active components of the overvoltage protection module, such as voltage controlled impedances, operate in their linear mode of operation to reduce unwanted emissions during this regulation process.

18 Claims, 4 Drawing Sheets

REDUCING EMISSIONS IN A NEAR FIELD COMMUNICATIONS (NFC) CAPABLE DEVICE

CROSS-REFERENCE TO RELATED APPLICATIONS

The present application claims the benefit of United Kingdom Patent Appl. Nos.: GB1009003.3, filed on May 28, 2010; GB1009000.9, filed on May 28, 2010; GB1009004.1, filed on May 28, 2010; GB1008995.1, filed on May 28, 2010; GB1008998.5, filed on May 28, 2010; GB1008443.2, filed on May 20, 2010; GB1008444.0, filed on May 20, 2010; and GB1008445.7, filed on May 20, 2010, each of which is incorporated herein by reference in its entirety.

BACKGROUND

1. Field of Invention

The invention relates to near field communications (NFC), and more specifically to reducing emission from a NFC capable device.

2. Related Art

Near field communications (NFC) requires that NFC devices to be present within a relatively small distance from one another so that their corresponding magnetic fields can exchange information. Ranges of up to several centimeters (generally a maximum of 1 meter) are common for NFC devices. Typically, a first NFC device transmits or generates a magnetic field modulated with the information, such as the credit information or the ticket fare information. This magnetic field inductively couples onto a second NFC device that is proximate to the first NFC device. The second NFC device may respond to the first NFC device by transmitting or generating its own modulated magnetic field and inductively coupling this magnetic field to the first NFC device. There are several standards in existence which set out certain communication protocols and functional requirements for NFC and other communications using the near field, such as ISO/IEC 14443, ISO 15693, ISO/IEC 18092 and ISO/IEC 21481.

A NFC communicator is a type of NFC device that is capable of operating in an initiator mode to initiate a communication with another NFC enabled device and in a target mode to respond to the initiation of a communication by another NFC enabled device. The term "NFC enabled device" includes not only the NFC communicator but also other initiator NFC enable devices, such as a RFID transceiver or reader that are capable of initiating a near field RF communication and/or a RFID transponder or tag that are capable of responding to initiation of a NFC by another NFC enabled device to provide some examples. Hence, the NFC communicator can act as both a RFID transceiver and a RFID transponder and are able to communicate with other NFC communicators, RFID transceivers and RFID transponders.

NFC devices are being integrated into mobile devices, such as mobile telephones to provide an example, to facilitate the use of these mobile devices in conducting daily transactions. For example, instead of carrying numerous credit cards, the credit information provided by these credit cards could be stored onto a NFC device. The NFC device is simply tapped to a credit card terminal to relay the credit information to it to complete a transaction. As another example, a ticketing writing system, such as those used in bus and train terminals, may simply write ticket fare information onto the NFC device instead of providing a ticket to a passenger. The passenger simply taps the NFC device to a reader to ride the bus or the train without the use of a paper ticket.

Commonly, the mobile devices include a high frequency receiver and transmitter for long range communications over large distances. When the NFC device is integrated into these mobile devices, it is advantageous to reduce unwanted emissions from the NFC device in frequency bands employed by the mobile devices. Thus, there is a need to reduce unwanted emissions from the NFC device when it is integrated into a host device. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
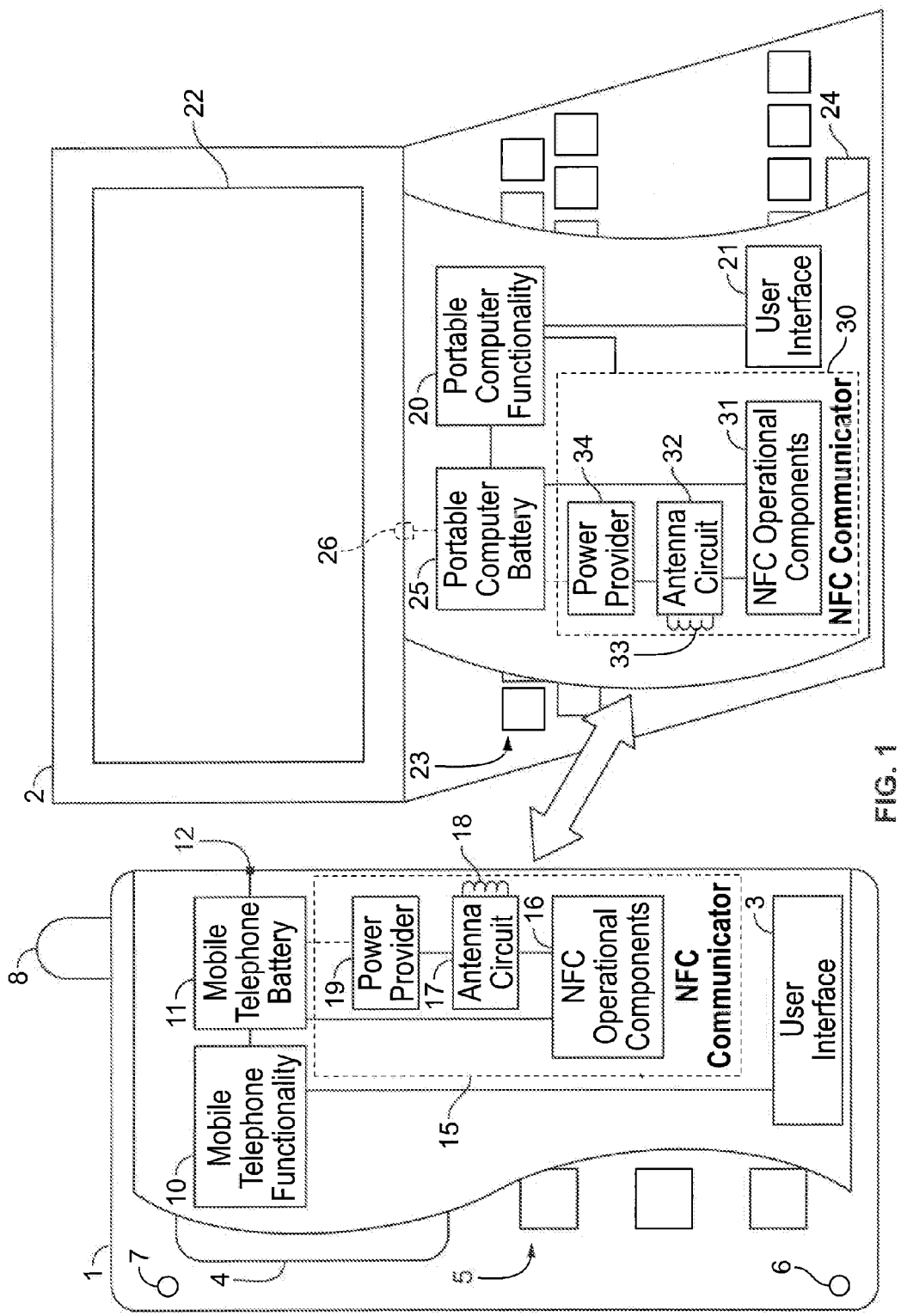
FIG. 1 illustrates a communication between two NFC enabled devices according to an exemplary embodiment of the present invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although, the description of the present invention is to be described in terms of near field communications (NFC) devices and NFC enable devices, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

An Exemplary Near Field Communications (NFC) Environment

FIG. 1 illustrates a communication between two NFC enabled devices according to an exemplary embodiment of the present invention. The representations of NFC enabled devices as shown in FIG. 1 have been shown partly cut-away and functionalities provided by these NFC enabled devices are illustrated by way of a functional block diagram within each of the NFC enabled devices.

As shown in FIG. 1, a first NFC enabled device may represent a mobile telephone 1 and as second NFC enabled device may represent a portable computer 2, such as a notebook or laptop computer to provide some examples. However, these examples are not limiting, those skilled in the relevant art(s) will recognize that the first and the second NFC enabled devices may represent any suitable NFC capable devices such as mobile telephones, portable computing devices, other computing devices such as personal, laptop, or desktop computers, computer peripherals such as printers, portable audio and/or video players, a payment system, ticketing writing systems such as parking ticketing systems, bus ticketing systems, train ticketing systems or entrance ticketing systems to provide some examples, or in ticket reading systems, toys, games, posters, packaging, advertising materials, product inventory checking systems and/or any other suitable electronic device that will be apparent to those skilled in the relevant art(s) without departing from the spirit and scope of the invention. As another possibility, the first and the second NFC enabled devices may be included within or coupled to a peripheral device, such as a smart card or other secure element which may be stand alone or included within or intended to be inserted into another electrical device. For example a SIM card for use in the mobile telephone 1.

The mobile telephone 1 has the usual features of a mobile telephone including mobile telephone functionality 10 for controlling operation of the mobile telephone 1, an antenna 8 for enabling connection to a mobile telecommunications network, and a user interface 3 with a display 4, a keypad 5, a microphone 6, and a loudspeaker 7. The mobile telephone also has a chargeable battery 11 coupled to a charging socket 12 to enable charging of the chargeable battery 11. The mobile telephone 1 may have an alternative or additional power supply (not shown in FIG. 1), for example a reserve battery or emergency battery.

Similarly the portable computer 2 has the usual features of a portable computer including portable computer functionality 20 such as a processor with associated memory such as ROM, RAM and/or hard disk drive, one or more removable media drives such as a floppy disk drive and/or a CDROM or DVD drive, and/or a communications device for enabling the portable computer 2 to connect to a network. The portable computer 2 also includes a user interface 21 including a display 22, a keyboard 23, and a pointing device, as shown a touchpad 24. The portable computer 2 also has a chargeable battery 25 coupled to a charging socket 26 to enable charging of the chargeable battery 25.

The mobile telephone functionality 10 and the portable computer functionality 20 may further include a long range communicator to transmit or receive signals in one or more of the following frequency bands: 75-130 MHz (the FM frequency band), 0.75 to 1.0 GHz (the lower cellular phone signal band), 1.75 GHz to 2 GHz, (the upper cellular signal band) and 2.3 GHz to 2.5 GHz (the BlueTooth™ and Wi-FI band) to provide some examples.

In addition, as shown in FIG. 1, the mobile telephone 1 and the portable computer 2 include a NFC communicator 15 and a NFC communicator 30, respectively. The NFC communicators 15 and 30 are incorporated within the mobile telephone 1 and the portable computer 2, respectively, as with the other functional blocks, may be discrete entities within the mobile telephone 1 or the portable computer 2, or may be provided by features dispersed throughout or integrated within or a part of the mobile telephone 1 or the portable computer 2.

As shown in FIG. 1, the NFC communicators 15 and 30 include NFC operational components 16 and 31, respectively, for, as will be described below, enabling control of the NFC functionality and generation, modulation, and demodulation of a communications signal. The NFC communicators 15 and 30 also include an antenna circuit 17 and 32, respectively. The antenna circuits 17 and 32 include an inductive coupling element, such as inductor or coil to provide some examples, in the form of an antenna 18 and 33, respectively.

The NFC communicators 15 and 30 interact with each other to exchange information such as data and/or one or more commands. The NFC communicators 15 and 30 may be configured to operate according to an active communications mode and/or a passive communications mode. The NFC operational component 16 modulates its corresponding information onto a first carrier wave, referred to as a modulated carrier wave, and generates a first magnetic field by applying the modulated carrier wave to the antenna 18. The NFC operational component 16 ceases to generate the first magnetic field after transferring the information to the NFC communicator 30 in the active communications mode. Alternatively, in the passive communications mode, the NFC operational component 16 continues to apply the first carrier wave without the information to the antenna 18, referred to as an unmodulated carrier wave, once the information has been transferred to the NFC communicator 30.

The antenna 18 is sufficiently proximate to the antenna 33 such that a communication from the NFC communicator 15 is inductively coupled onto the antenna 33. The NFC operational component 31 demodulates the communication from the NFC communicator 15 to recover the information. The NFC operational component 31 may respond to the information by modulating its corresponding information onto a second carrier wave and generating a second magnetic field by applying this modulated carrier wave to the antenna 33 in the active communications mode. Alternatively, the NFC operational component 31 may respond to the information by modulating the first carrier wave that is inductively coupled onto the antenna 33 with its corresponding information in the passive communications mode.

The NFC communicators 15 and 30 are coupled to the mobile telephone and portable computer functionality 10 and 20, respectively, to enable data and/or control commands to be sent between the NFC communicators 15 and 30 and the mobile telephone 1 or the portable computer 2, respectively, and to enable user input to these NFC communicators. Communication between the user interface 3 or 21 and the NFC communicator 15 or 30 is via the host device functionality 11 or 20, respectively.

The NFC communicator 15 and 20 also include a power deriver 19 and 34, respectively. The power deriver 19 and 34 may represent power supplies within the mobile telephone 1 or the portable computer 2 or specific to the NFC communicators 15 and 30, for example a button cell battery, or other small battery. The power derivers 19 and 34 may include a coupling to derive power from the corresponding device chargeable battery 11 or 25 i.e. the primary power supply. The power derivers 19 and 34 may also harvest a power source from a communications signal to adequately operate the NFC communicator 15 and 30, respectively. In the interest of simplicity, power supply couplings from the power provider 19 and 34 to other components of the mobile telephone 1 and the portable computer 2, respectively, are not shown in FIG. 1.

Figure 2:
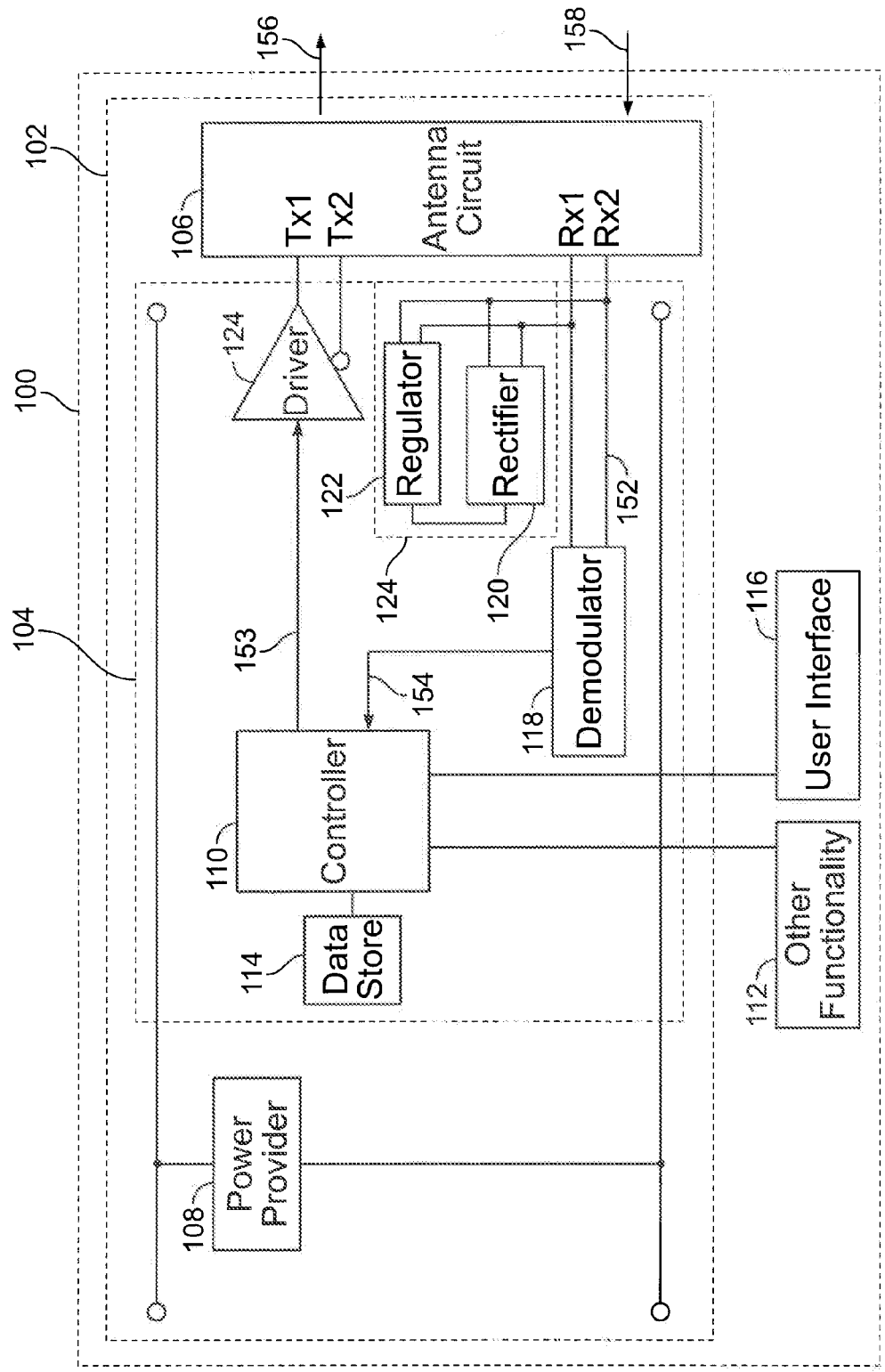
FIG. 2 illustrates a block diagram of a NFC device that may implemented as part of one of the NFC enabled devices according to an exemplary embodiment of the present invention.

An Exemplary Near Field Communications (NFC) Device that is Used within the Communications Environment FIG. 2 illustrates a block diagram of a NFC device that may implemented as part of one of the NFC enabled devices according to an exemplary embodiment of the present invention. A NFC enabled device 100 may represent an exemplary embodiment of one of the NFC enabled devices as described in FIG. 1. The NFC enabled device 100 includes a near field communicator 102 that includes near field operational components 104, an antenna circuit 106, and a power provider 108. Although the antenna circuit 106 is illustrated as part of the near field communicator 102, those skilled in the relevant art(s) will recognize that this depiction of antenna circuit 106 is for illustrative purposes only and other arrangements are contemplated. For example the antenna circuit 106 may be external to the near field communicator 102 and be carried by the NFC enabled device 100. In addition, the near field communicator 102 and/or the antenna circuit 106 may include one or more interface circuits coupling one or more transmit pins, such as Tx1 and/or Tx2, and/or one or more receive pins, such as Rx1 and/or Rx2, to the antenna circuit 106.

The near field operational components 104 include a controller 110 to control overall operation of the near field communicator 102. Alternatively, the NFC enabled device 100 may be coupled to a host device, such as a mobile telephone, a portable computing device, other computing devices such as a personal, a laptop, or a desktop computer, computer peripherals such as a printer, a portable audio and/or video player, a payment system, ticketing writing systems such as a parking ticketing system, a bus ticketing system, a train ticketing systems or an entrance ticketing system, or in a ticket reading system, a toy, a game, a poster, packaging, advertising materials, a product inventory checking system and/or any other suitable electronic device that will be apparent to those skilled in the relevant art(s) without departing from the spirit and scope of the invention. The overall operation of the near field communicator 102 may be shared among the host device, for example through other functionality 112, and the controller 110. In such circumstances, all or part of the control of the near field communicator 102 may be provided by the other functionality 112. For example the controller 110 may control modulation and modulation protocols whereas the data to be transmitted may be provided by the other functionality 112.

The controller 110 is coupled to a data store 114 for storing information, such as one or more commands and/or data that is to be transmitted from and/or data that is received by the NFC enabled device 100. The near field operational components 104 may additionally be connected or coupled with at least one of the other functionality 112, such as the mobile telephone functionality 10 and/or the portable computer functionality 20 to provide some examples, and a user interface 116, such as the user interface 3 and/or the user interface 21 to provide some examples. The controller 110 may receive the information from the other functionality 112, the data store 114, and/or the user interface 116 and/or provide the information to the other functionality 112, the data store 114, and/or the user interface 116. The controller 110 may be implemented using a microprocessor, such a RISC processor or any other suitable microprocessor or a state machine. Program instructions for programming the controller 110 and/or the information may be stored in an internal memory of the controller and/or received via the other functionality 112, the data store 114 and/or the user interface 116.

The near field operational components 104 may recover information, such as one or more commands and/or data, that is transferred from another NFC capable device. As shown in FIG. 2, the near field operational components 104 also include a demodulator 118 to demodulate a recovered communication signal 152 to provide recovered information 154. The demodulator 118 demodulates the recovered communication signal 152 to recover information, such as one or more commands and/or data, using any suitable analog or digital modulation technique such as amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

The recovered information 154 may include one or more commands and/or data. The controller 110 may issue and/or execute the one or more commands to control the overall operation and/or configuration of the NFC enabled device 100. For example, the controller 110 may issue and/or execute commands to control operations of the NFC enabled device 100, as well as other NFC capable devices, such as a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the invention. As another example, the controller 110 may format the recovered information 154 into a suitable format for transmission to the other functionality 112, the data store 114, and/or the user interface 116 and may perform error decoding, such as cyclic redundancy check (CRC) decoding to provide an example, on the recovered information 154.

The near field operational components 104 may transfer information, such as one or more commands and/or data, to another NFC capable device. The controller module 110 may modulate information received the other functionality 112, the data store 114, and/or the user interface 116 onto a carrier wave to provide a modulated communication as transmission information 153. The controller module 110 may modulate the information using any suitable analog or digital modulation technique such as amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). Alternatively, the controller module 110 may simply provide the carrier wave without the information to provide an unmodulated communication as the transmission information 153.

As shown in FIG. 2, the near field operational components 104 may further include a driver 124 to amplify the transmission information 153. Although not shown in FIG. 2, the driver 124 is optional, thereby allowing the transmission information 153 to load modulate a magnetic field of another NFC capable device that is inductively coupled onto the antenna circuit 106. In an exemplary embodiment, a separate signal generator (not shown) that operates under the control of the controller 110 may be configured to provide the carrier wave. In this exemplary embodiment, the driver 124 gates or switches the carrier wave in accordance with the information to provide the transmission information 153.

The controller 110 may issue and/or execute commands to cause the NFC enabled device 100 to operate in an initiator mode of operation to initiate a communication and/or a target mode of operation to respond to a communication. The mode of operation may be determined by the controller 110 or may be determined in dependence on the nature of any communications signal that is inductively coupled to the antenna circuit 106. When in the initiator mode of operation, the controller 110 causes the NFC enabled device 100 to initiate communications with another NFC capable device, such as another NFC communicator in target mode, a RFID tag, and/or transponder to provide some examples, that is sufficiently proximate. While in target mode of operation, the NFC enabled device 100 waits for a communication from another NFC capable device initiating a communication, such as a NFC communicator, a RFID initiator, and/or a transceiver to provide some examples. Typically, the other NFC capable device is operable at the same frequency and in accordance with the same protocols, for example in accordance with the protocols set out in various standards such as ISO/IEC 18092, ISO/IEC 21481, ISO/IEC 14443 and ISO/IEC 15693, as the NFC enabled device 100.

When in the initiator or target mode of operation, the near field operational components 104 may communicate in accordance with an active or a passive protocol. When using the active protocol, the NFC enabled device 100 modulates the information onto the carrier wave and applies this modulated carrier wave to the antenna circuit 106 to provide the transmitted communication signal 156. Following the transfer of the information to another NFC capable device, the NFC enabled device 100 will cease to provide the transmitted communication signal 156. However, the NFC enabled device 100 will continue to apply the carrier wave without any information to the antenna circuit 106 to maintain the transmitted communication signal 156 when using the passive protocol.

When the NFC enabled device 100 is operating using the active protocol, another NFC capable device responds to the information by modulating its response with its corresponding carrier wave. The other NFC capable device applies this modulated carrier wave to its corresponding antenna to generate another magnetic field to inductively couple its response onto the antenna circuit 106. However, the other NFC capable device will modulate the magnetic field generated by the NFC enabled device 100 with its corresponding information to inductively couple its response onto the antenna circuit when the NFC enabled device 100 is operating using the passive protocol. The protocol being used by the NFC enabled device 100 may depend on instructions received from the controller 110 and/or the response received from other NFC capable devices.

The antenna circuit 106 may be implemented as a single-ended circuit with one transmit output and one receive input or a double-ended circuit having two transmit outputs and two receive inputs, or may be single-ended for one of receive and transmit and double-ended for the other. For example, as shown in FIG. 2, the antenna circuit 106 represents a double-ended antenna circuit including two transmit outputs Tx1 and Tx2 and two receive inputs Rx1 and Rx2. The antenna circuit 106 may apply the transmission information 153 to an inductive coupling element, such as a resonant tuned circuit to provide an example, to generate the magnetic field to provide the transmitted communication signal 156. Typically, the inductive coupling element is optimized or tuned to a particular frequency, or range of frequencies, commonly referred to as its resonant frequency.

Alternatively, the antenna circuit 106 may apply the transmission information 153 to modulate a magnetic field of another NFC capable device that is inductively coupled onto the antenna circuit 106. Additionally, another NFC capable device may modulate its information onto its corresponding carrier wave and apply this modulated carrier wave to its corresponding antenna circuit to generate its corresponding magnetic field to inductively couple a received communications signal 158 onto the inductive coupling element to provide the recovered communication signal 152. Alternatively, another NFC capable device may modulate the magnetic field of the NFC enabled device 100 that is inductively coupled onto its corresponding antenna circuit with the received communications signal 158 to provide the recovered communication signal 152.

An overvoltage protection module 124 adaptively limits a power level of the recovered communication signal 152 to protect the NFC operational components 108. For example, another NFC capable device may inductively couple the received communications signal 158 onto the antenna circuit 106 to provide the recovered communication signal 152. As the other NFC capable device moves closer to the NFC operational components 108, the power of the received communications signal 158, as well as the power of the recovered communication signal 152, increases. The overvoltage protection module 124 regulates the power of the recovered communication signal 152 to protect the NFC operational components 108 when the power of the recovered communication signal 152 exceeds a power threshold.

As shown in FIG. 2, the overvoltage protection module 124 includes a rectifier 120 and a regulator 122. The rectifier 120 provides a rectified voltage for use by the NFC enabled device 100 and the regulator 122 sets the voltage for the near field operational components 104, such as a pin voltage to provide an example. For simplicity, couplings between the rectifier 120, the regulator 122, and the NFC enabled device 100 are not shown in FIG. 2. Specifically, the recovered communication signal 152 may be characterized by an alternating current (AC) power, such as a voltage and/or current, as seen at the transmit/receive pins Tx1, Tx2, Rx1 and Rx2. For example, the recovered communication signal 152 may be characterized as by a first power AC1 and a second power AC2. The rectifier 120 and the regulator 122 are configured and arranged to detune the antenna circuit 106 to decrease the power of the recovered communication signal 152 to regulate its AC power.

The power provider 108 may harvest a power source from the recovered communications signal 152. The power source may include sufficient power to adequately operate the near field communicator 102. In the interest of simplicity, power supply couplings from the power provider 108 to other components of the near field communicator 102 are not shown in FIG. 2.

Figure 3:
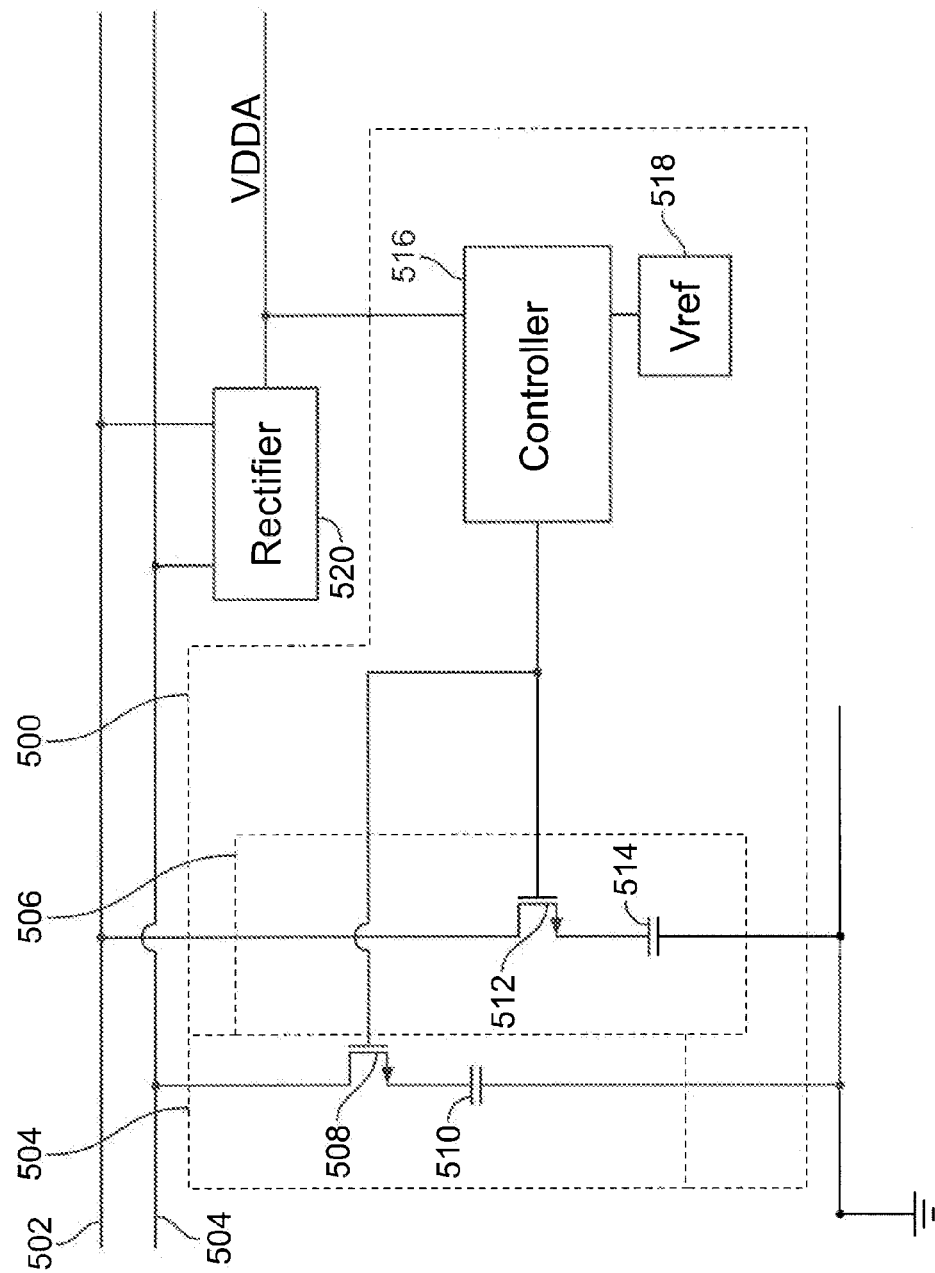
FIG. 3 illustrates a block diagram of a shunt regulator that is implemented as part of the NFC device according to an exemplary embodiment of the present invention.

Exemplary Shunt Regulator that is Implemented as Part of the Near Field Communications Device FIG. 3 illustrates a block diagram of a shunt regulator that is implemented as part of the NFC device according to an exemplary embodiment of the present invention. The antenna circuit 106 provides the recovered communication signal 152 to a first antenna coupling 302 and a second antenna coupling 304, respectively. Typically, the recovered communication signal 152 represents a differential communications signal that may be characterized by a first power AC1, such as a first AC voltage and/or current, and a second power AC2, such as a second AC voltage and/or current. A shunt regulator 300 is configured to adjust one or more voltage controlled impedances to detune the antenna circuit 106 to regulate the first power AC1 and the second power AC2. The shunt regulator 300 may represent an exemplary embodiment of the regulator 122.

A first variable impedance 504 is coupled to the second antenna coupling 304 and a second variable impedance 506 is coupled to the first antenna coupling 302. The first variable impedance 504 includes a transistor 508 that is coupled in series with a capacitor 510. Similarly, the second variable impedance 506 includes a transistor 512 that is coupled in series with a capacitor 514. The transistor 508 and/or the transistor 512 may be implemented using a metal oxide semiconductor field-effect transistor (MOSFET), a bipolar junction transistor (BJT), a junction field effect transistor (JFET), or any other suitable voltage controlled impedance that may be apparent to those skilled in the relevant art(s). The transistor 508 and/or the transistor 512 may represent voltage controlled impedances that are configured to operate in a non-conducting mode of operation and/or a conducting mode of operation, such as a linear mode of operation or a saturation mode of operation to provide some examples. Alternatively, the transistor 508 and/or the transistor 512 may represent switching transistors that are configured to be activated and deactivated. As discussed above, the antenna circuit 106 is typically optimized or tuned to a particular frequency, or range of frequencies, commonly referred to as its resonant frequency. The shunt regulator 500 may adjust an impedance of the first variable impedance 504 and/or the second variable impedance 506 to adjust or detune the resonant frequency of the antenna circuit 106 from its optimal value. Consequently, the first power AC1 and the second power AC2 of the recovered communication signal 152 will be reduced.

A shunt regulator controller 516 compares a supply voltage VDDA from a rectifier 520 and a reference voltage VREF from a reference voltage generator 518 to provide an output voltage VSHUNT to the first variable impedance 504 and/or the second variable impedance 506. In an exemplary embodiment, the shunt regulator controller 408 may be implemented using an error amplifier to compare the supply voltage VDDA and the reference voltage VREF.

During an undervoltage condition, namely the supply voltage VDDA is less than or equal to the reference voltage VREF, the shunt regulator controller 516 causes the transistor 508 and the transistor 512 to operate in their non-conducting modes of operation. In this mode of operation, the first variable impedance 504 and the second variable impedance 506 appear as high impedances to the antenna circuit 106. Consequently, the resonant frequency of the antenna circuit 106 will remain tuned to the particular frequency, or the range of frequencies.

However, during an overvoltage condition, namely the supply voltage VDDA is greater than the reference voltage VREF, the shunt regulator controller 516 causes the transistor 508 and the transistor 512 to operate in their conducting modes of operation. In this situation, the first variable impedance 504 and the second variable impedance 506 no longer appear as the high impedances to the antenna circuit 106. Rather, the first variable impedance 504 and the second variable impedance 506 tune the antenna circuit 106 to another particular frequency, or another range of frequencies, commonly referred to as detuning. Consequently, the first power AC1 and the second power AC2 of the recovered communication signal 152 will be reduced during the overvoltage condition.

As discussed above, the transistor 508 and/or the transistor 512 may be configured to operate in their linear modes of operation or their saturation modes of operation while operating in the conducting mode of operation. However, the transistor 508 and/or the transistor 512 may cause the recovered communication signal 152 to compress or clip while operating in their saturation modes of operation, thereby introducing unwanted emissions, such as harmonic representations of the recovered communication signal 152 to provide an example, onto the recovered communication signal 152. The transistor 508 and/or the transistor 512 may be prevent from operating in their saturation modes of operation while operating in the conducting mode of operation by intelligently selecting the reference voltage VREF. In this situation, the transistor 508 and/or the transistor 512 solely operate in their linear modes of operation while operating in the conducting mode of operation. Typically, impedances of the transistor 508 and the transistor 512 substantially linearly increase as more voltage is applied to their respective gates in their linear modes of operation.

Typically, the reference voltage VREF is determined such that the transistor 508 and the transistor 512 operate in their linear modes of operation when the supply voltage VDDA is greater than or equal to the reference voltage VREF, but less than maximum field intensity voltage. The maximum field intensity voltage may correspond to a voltage level of the recovered communications signal 152 that results from a maximally intense magnetic field being inductively coupled onto the antenna circuit 106. The maximally intense magnetic may represent an intensity of a magnetic field at approximately a maximum operating range of the NFC enabled device 100 as set forth in a NFC standard, such as ISO/IEC 14443, ISO 15693, ISO/IEC 18092, and/or ISO/IEC 21481 to provide some examples. Alternatively, the maximally intense magnetic field may represent an intensity of a magnetic field at approximately which increased intensities begin to damage the NFC enabled device 100. The reference voltage VREF may represent a static voltage or may dynamically vary with operational conditions, such as temperature to provide an example.

Figure 4:
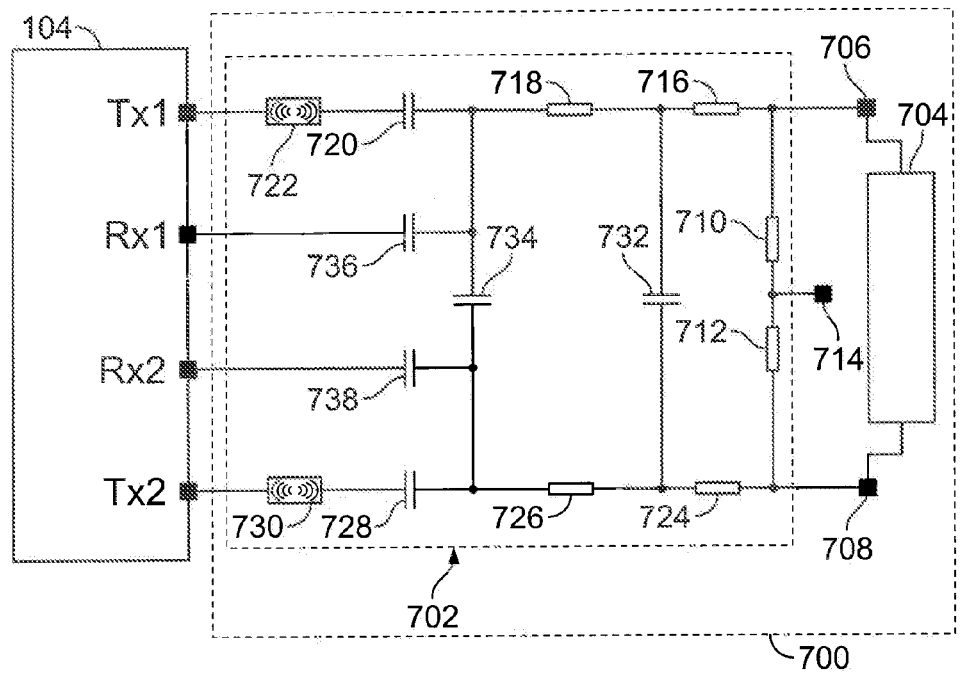
FIG. 4 illustrates a block diagram of a first antenna interface circuit that is implemented as part of the NFC device according to an exemplary embodiment of the present invention.

Exemplary Antenna Circuits that are Implemented as Part of the Near Field Communications Device FIG. 4 illustrates a block diagram of a first antenna interface circuit that is implemented as part of the NFC device according to an exemplary embodiment of the present invention. An antenna circuit 700 includes an interface circuit coupling transmit pins Tx1 and Tx2 and receive pins Rx1 and Rx2 as shown in FIG. 2, to the near field operational components 104. The antenna circuit 700 may represent an exemplary embodiment of the antenna circuit 106.

As shown in FIG. 4, the antenna circuit 700 includes an antenna interface 702 coupled between the near field operational components 104 and an inductive coupling element 704. The near field operational components 104 may apply the transmission information 153 to transmit pins Tx1 and/or Tx2. The antenna interface 702 provides the transmission information 153 to the inductive coupling element 704 for transmission to another NFC capable device. Similarly, another NFC capable device may inductively couple the received communications signal 158 onto the inductive coupling element 704 to provide the recovered communication signal 152. The antenna interface 702 provides the recovered communication signal 152 to receive pins Rx1 and/or Rx2.

The antenna interface 702 includes a first antenna connection 706 and a second antenna connection 708 for coupling the antenna interface 702 to the inductive coupling element 704. A first resistance 710 and a second resistance 712 are configured and arranged to form a potential divider that is coupled in parallel to the inductive coupling element 704. The first resistance 710 and a second resistance 712 couples the first antenna connection 706 and the second antenna connection 708, respectively, to a third antenna connection 714. The third antenna connection 714 may be further coupled to a ground or a reference potential.

A first resistance 716 and a second resistance 718 are coupled in series between the first antenna connection 706 and a capacitor 720. The capacitor 720 is further coupled to the transmit pin Tx1 by an inductor 722. Similarly, a first resistance 724 and a second resistance 726 are coupled in series between the second antenna connection 708 and a capacitor 728. The capacitor 728 is further coupled to the transmit pin Tx2 by an inductor 730. The inductors 722 and 730 attenuate high frequency signal components of the transmitted communication signal 156 to reduce coupling of these high frequency components from the transmit pins Tx1 and Tx2 to the first antenna connection 706 and the second antenna connection 708, respectively. Typically, these high frequency components are characterized as having frequencies that are larger than a frequency of carrier wave used to modulate the transmission information 153. The inductors 722 and 730 facilitate use of the near field operational components 104 in the vicinity of or in conjunction with a high frequency receiver such as a GSM receiver to provide an example.

The first resistance 716 and the first resistance 724 are further coupled to a capacitor 732. Similarly, the second resistance 718 and the second resistance 726 are further coupled to a capacitor 734. The capacitor 734 is further coupled to a capacitor 736 and to a capacitor 738. The capacitor 736 and the capacitor 738 are further coupled to the receive pin Rx1 and the receive pin Rx2, respectively.

In operation, the antenna interface 702 provides a coupling between the transmit pins Tx1 and Tx2 and the receive pins Rx1 and Rx2 and the inductive coupling element 704 to enable inductive coupling of the transmitted communication signal 156 onto an antenna circuit of another NFC capable device or coupling of the received communications signal 158 from another NFC capable device onto the inductive coupling element 704. The inductive coupling element 704 may be implemented as a tuned LCR circuit selected to couple preferentially with a magnetic field in a particular frequency band, such as a frequency band including 13.56 MHz to provide an example.

Figure 5:
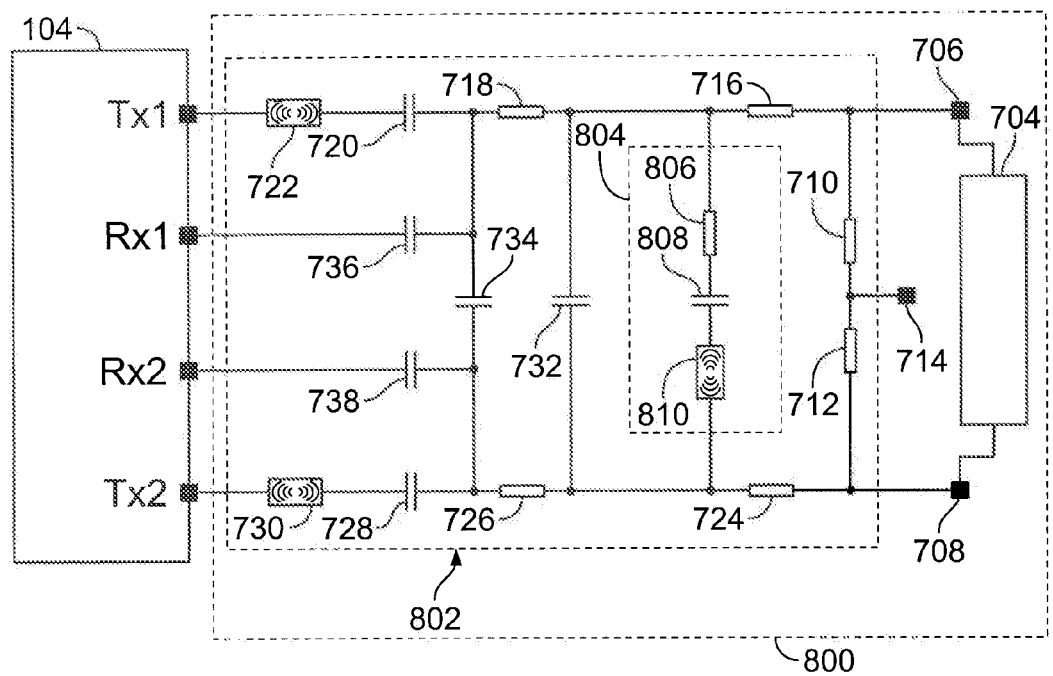
FIG. 5 illustrates a block diagram of a second antenna interface circuit that is implemented as part of the NFC device according to an exemplary embodiment of the present invention.

FIG. 5 illustrates a block diagram of a second antenna interface circuit that is implemented as part of the NFC device according to an exemplary embodiment of the present invention. An antenna circuit 800 includes an interface circuit coupling transmit pins Tx1 and Tx2 and receive pins Rx1 and Rx2 to the near field operational components 104. The antenna circuit 700 may represent an exemplary embodiment of the antenna circuit 106. The antenna circuit 800 shares many substantially similar features with the antenna circuit 700; therefore, only differences between the antenna circuit 700 and the antenna circuit 800 are to be discussed in further detail.

The antenna interface 802 further includes a filter 804 that is configured and arranged in parallel with the inductive coupling element 704. The filter 804 includes an inductor 810, a capacitor 808, and a resistance 806 that are configured and arranged in series to form a notch filter. The components of the filter are selected to filter unwanted emissions from the transmit pins Tx1 and Tx2 in a particular frequency band such as a VHF and/or a GSM frequency band for example.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A near field communications (NFC) device, comprising:
an antenna circuit configured to receive a communications signal to provide a recovered communications signal, the antenna circuit being tuned to receive the communications signal; and
near field operational components configured to recover information from the recovered communications signal, the near field operational components comprising:
a rectifier configured to rectify the recovered communications signal to provide a rectified output; and
a regulator configured to detune the antenna circuit to regulate a power level of the recovered communications signal when the rectified output is greater than a reference voltage.

2. The NFC device of claim 1, wherein:
the near field operational components are further configured to transfer second information to another NFC device, and
the near field operational components further comprise a driver configured to gate a carrier wave in accordance with the second information to provide a modulated communication and to apply the modulated communication to the antenna circuit to provide a transmitted communications signal to transfer the second information to the other NFC device.

3. The NFC device of claim 1, wherein the near field operational components further comprise:
a demodulator configured to demodulate the recovered communications signal to provide the information.

4. The NFC device of claim 1, wherein the communications signal is inductively coupled onto the antenna circuit.

5. The NFC device of claim 1, wherein the regulator comprises:
a variable impedance; and
a regulator controller configured to adjust an impedance of the variable impedance to detune the antenna circuit when the rectified output is greater than the reference voltage.

6. The NFC device of claim 5, wherein the variable impedance comprises:
a voltage controlled impedance; and
a capacitor coupled in series with the voltage controlled impedance.

7. The NFC device of claim 6, wherein the voltage controlled impedance is implemented using at least one of:
a metal oxide semiconductor field-effect transistor (MOSFET);
a bipolar junction transistor (BJT); and
a junction field effect transistor (JFET).

8. The NFC device of claim 1, wherein the reference voltage is less than a voltage level of the recovered communications signal, the recovered communications signal resulting from a maximally intense magnetic field being inductively coupled onto the antenna circuit.

9. The NFC device of claim 8, wherein the maximally intense magnetic field represents an intensity of a magnetic field at approximately a maximum operating range of the NFC device as set forth in an NFC standard.

10. The NFC device of claim 8, wherein the maximally intense magnetic field represents an intensity of a magnetic field at approximately which increased intensities begin to damage the NFC device.

11. The NFC device of claim 1, wherein the antenna circuit comprises:
an antenna interface; and
an inductive coupling element coupled to the antenna interface, the inductive coupling element being configured to receive the communications signal.

12. The NFC device of claim 11, wherein the antenna interface comprises:
a notch filter configured and arranged to be parallel with the inductive coupling element.

13. A method for regulating a power level of a recovered communications signal, the method comprising,
receiving, by a near field communications (NFC) device, a communications signal to provide the recovered communications signal, the NFC device being tuned to receive the communications signal;
rectifying the recovered communications signal to provide a rectified output; and
detuning the NFC device to regulate the power level of the recovered communications signal when the rectified output is greater than a reference voltage.

14. The method of claim 13, further comprising:
demodulating the recovered communications signal to provide recovered information.

15. The method of claim 13, wherein the detuning the NFC device comprises:
adjusting an impedance of a variable impedance to detune the NFC device when the rectified output is greater than the reference voltage.

16. The method of claim 13, wherein the reference voltage is less than a voltage level of the recovered communications signal, the recovered communications signal resulting from a maximally intense magnetic field being inductively coupled onto an antenna circuit of the NFC device.

17. The method of claim 16, wherein the maximally intense magnetic field represents an intensity of a magnetic field at approximately a maximum operating range of the NFC device as set forth in an NFC standard.

18. The method of claim 16, wherein the maximally intense magnetic field represents an intensity of a magnetic field at approximately which increased intensities begin to damage the NFC device.

* * * * *